F. G. HANEY.
POTTERY MACHINE.
APPLICATION FILED SEPT. 4, 1914.
1,145,767.
Patented July 6, 1915.
4 SHEETS—SHEET 1.
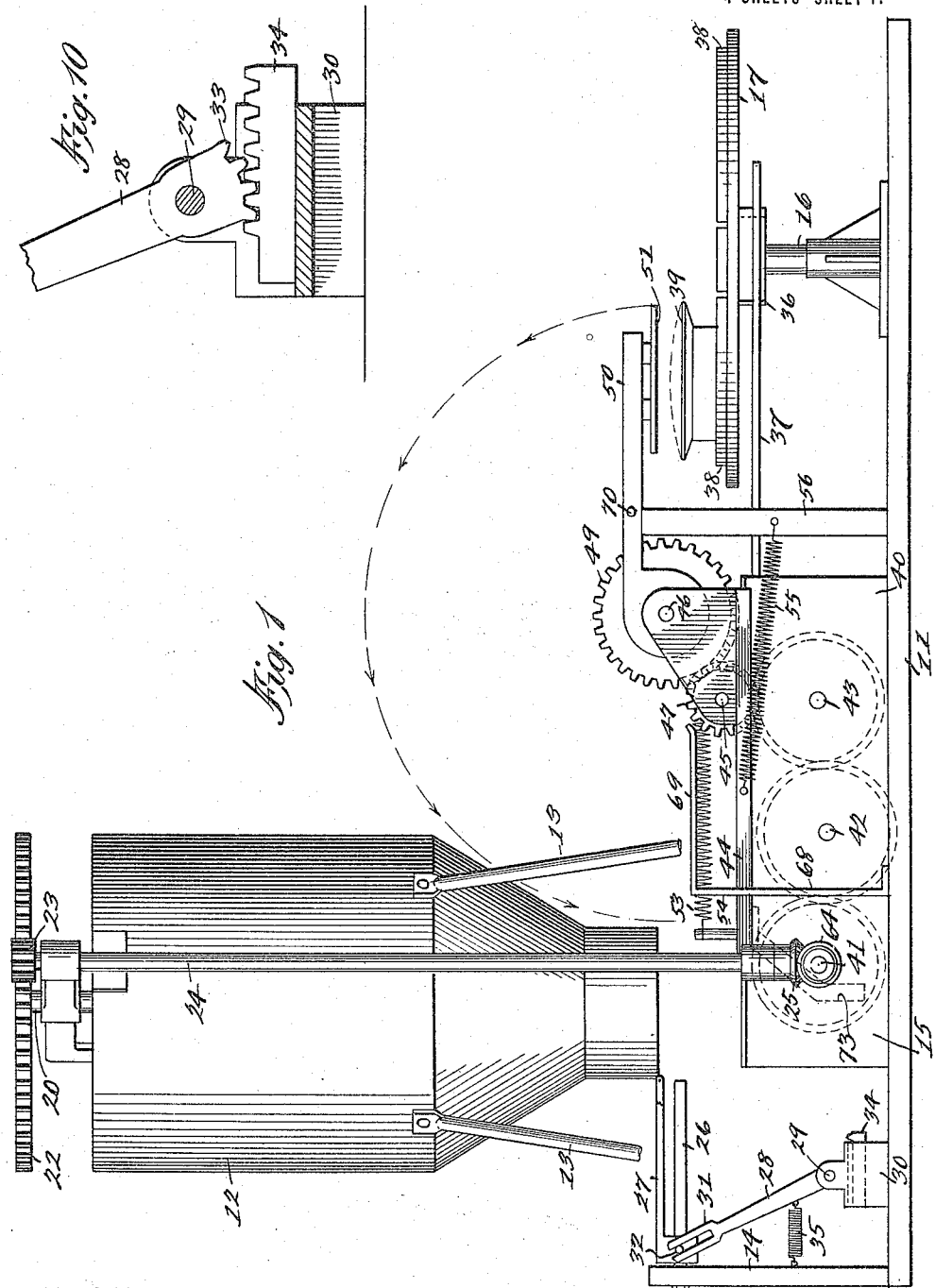
WITNESSES
F. D. Sweet
J. E. Larsen
INVENTOR
Fred G. Haney
BY Munn & Co.
ATTORNEYS

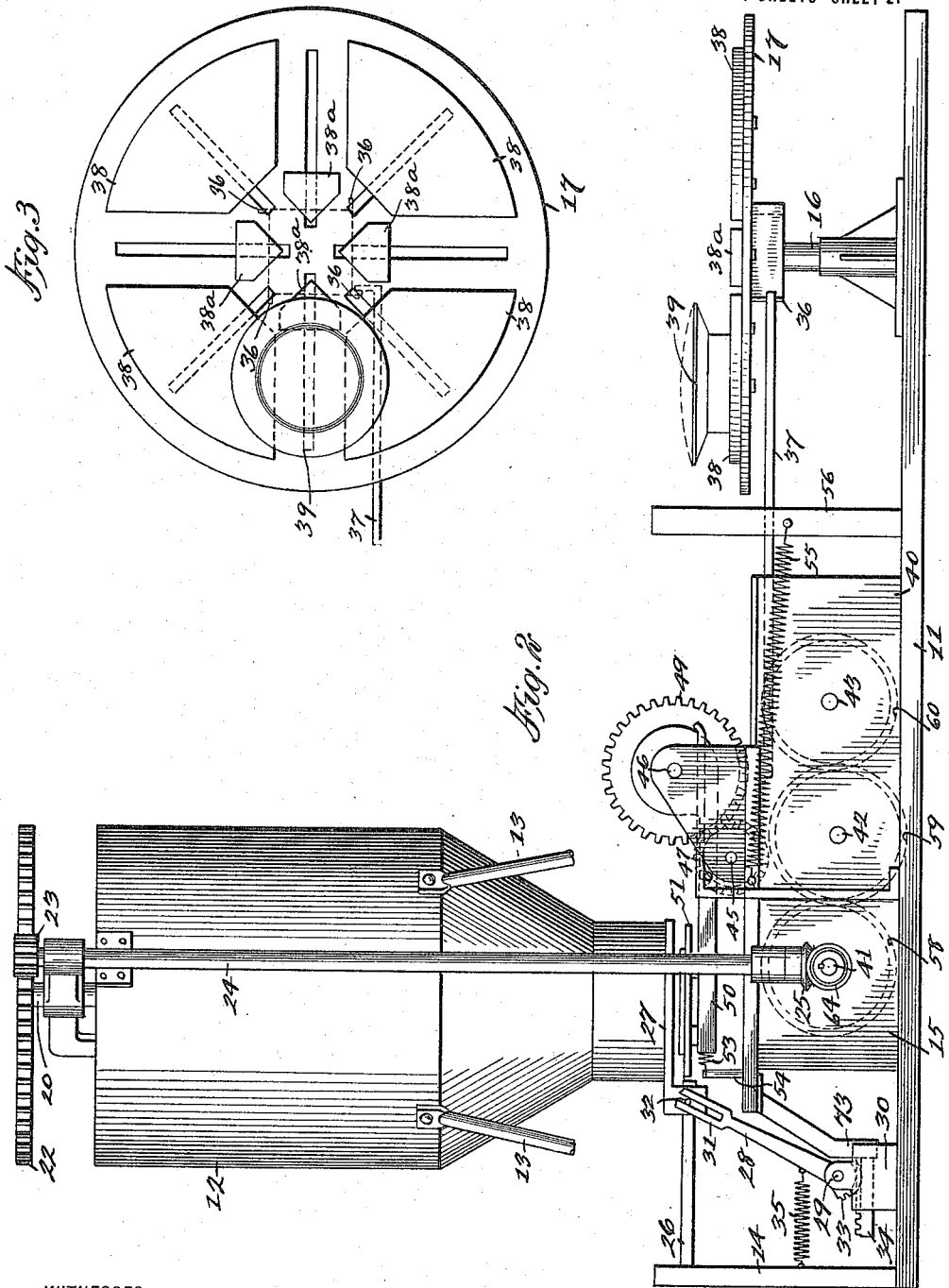

F. G. HANEY.
POTTERY MACHINE.
APPLICATION FILED SEPT. 4, 1914.
1,145,767.
Patented July 6, 1915.
4 SHEETS—SHEET 3.
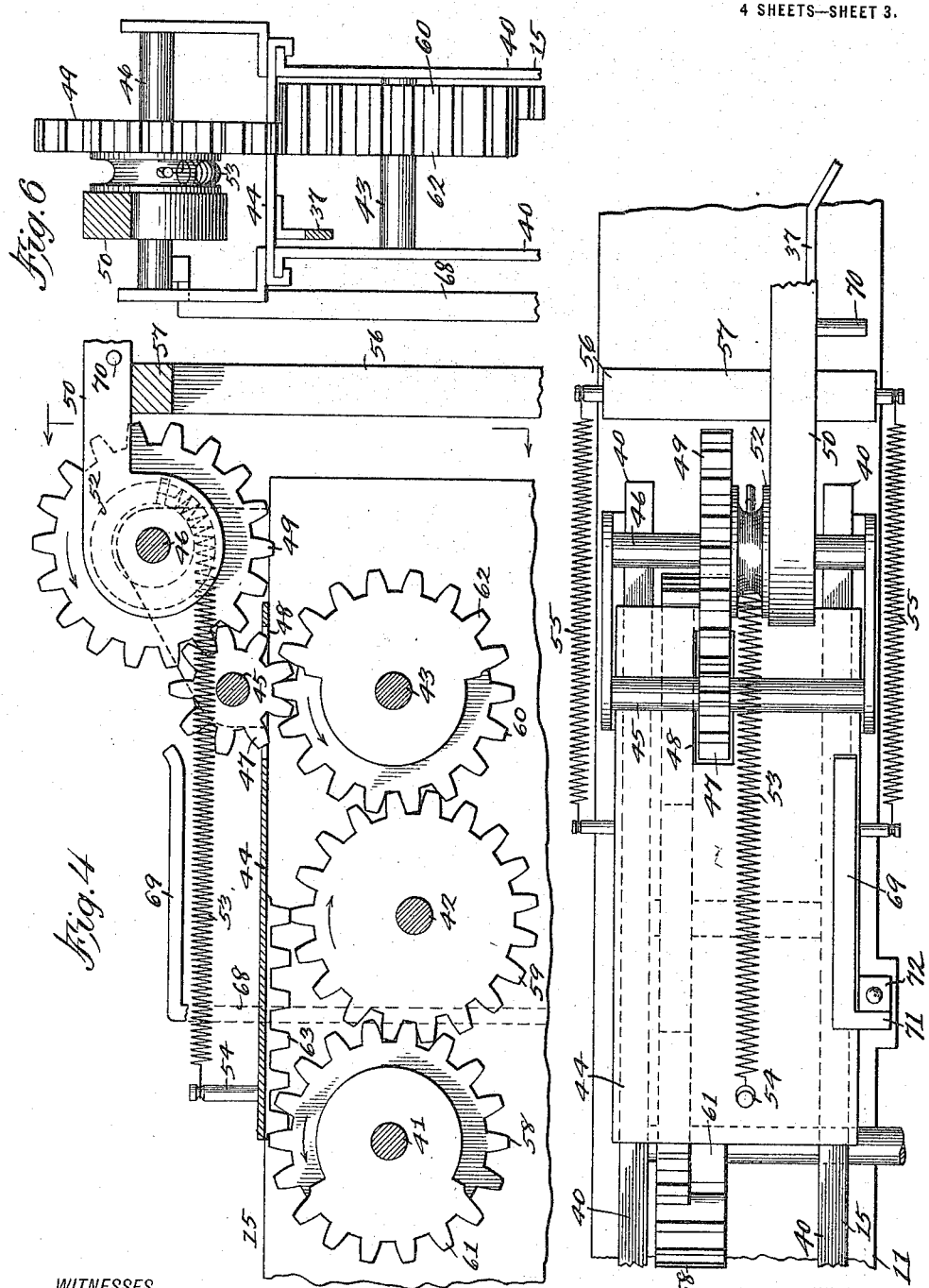
WITNESSES
F. D. Sweet.
J. C. Larsen
INVENTOR
Fred G. Haney
BY Munn & Co
ATTORNEYS

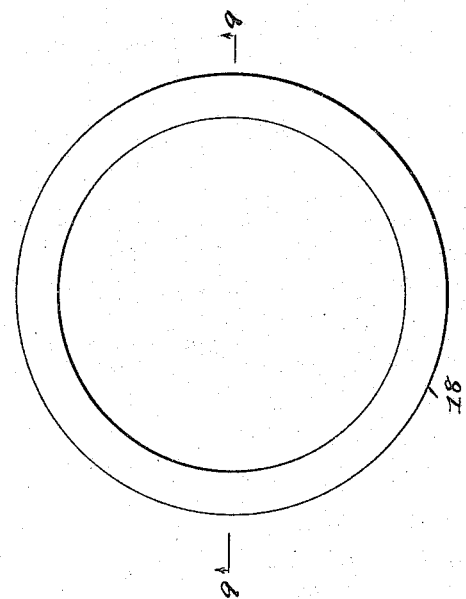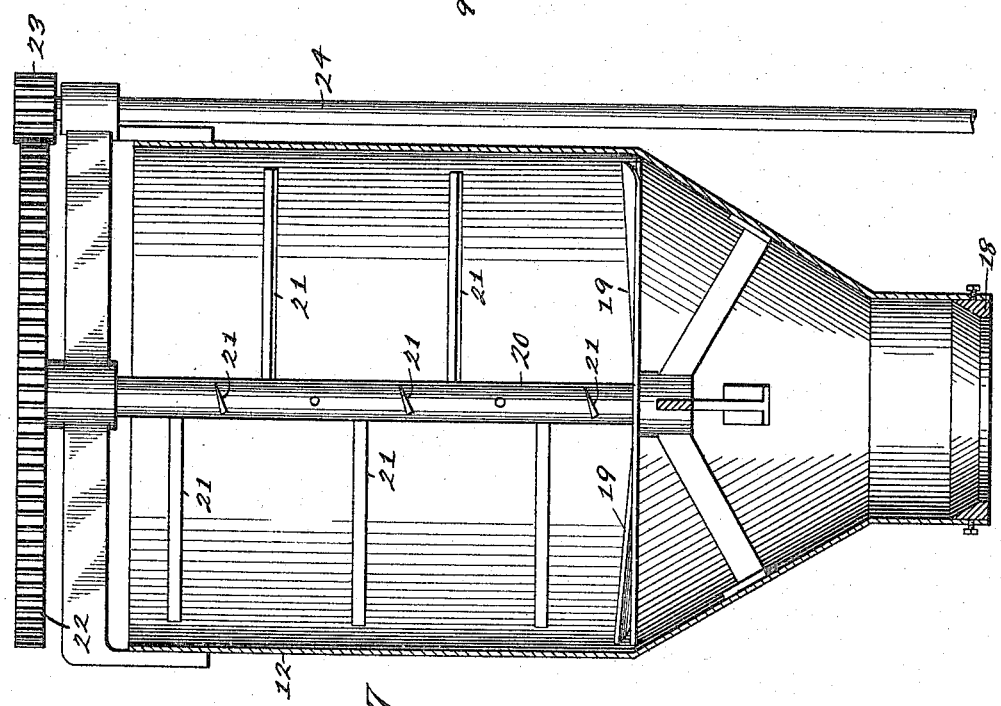

UNITED STATES PATENT OFFICE.

FRED G. HANEY, OF EAST LIVERPOOL, OHIO.

POTTERY-MACHINE.

1,145,767.   Specification of Letters Patent.   Patented July 6, 1915.

Application filed September 4, 1914.   Serial No. 860,207.

*To all whom it may concern:*

Be it known that I, FRED G. HANEY, a citizen of the United States, and a resident of East Liverpool, in the county of Columbiana and State of Ohio, have invented certain new and useful Improvements in Pottery-Machines, of which the following is a specification.

My invention relates to potteries, and the object thereof is to provide a machine for performing the operation of "batting out" and "balling", now done by hand, to get the clay in shape for the "jiggerman" in the formation of ware, such as plates, saucers, cups, bowls, etc. The present way of performing this operation is for boys to take a lump of clay and place it on a "batter" block which is composed of plaster of Paris, where the said lump of clay is flattened out to the proper size and thickness by striking the same with a "batter", also composed of plaster of Paris and having a bow-shaped handle, and, after the boy has so formed the lump of clay into a "bat", he passes it to the mold for the "jiggerman" to make into the proper ware; in "balling", the boy takes a lump of clay of the proper size and throws it into the mold for the "jiggerman" who forms a cup or bowl therefrom. It will be seen that uniformity in the sizes of the "bats" and "balls" is next to impossible, and it was in order to dispense with this manual labor, as well as to insure uniformity in size and shape of the "bats" and "balls" that my invention was conceived.

My invention is fully described in the following specification, of which the accompanying drawings form a part, in which the separate parts are designated by the same reference characters in each of the views, and in which:—

Figure 1 is a view in elevation of a machine constructed in accordance with my invention, in one position of the parts; Fig. 2 is a similar view with the parts in a different position; Fig. 3 is a plan view of a table shown in Fig. 2; Fig. 4 is an enlarged, fragmentary, sectional, view of a detail of the construction; Fig. 5 is a plan view thereof; Fig. 6 is a section taken on the line 6—6 of Fig. 4; Fig. 7 is an enlarged, sectional, view of the hopper which I employ; Fig. 8 is a plan view of another detail; Fig. 9 is a section taken on the line 9—9 of Fig. 8; and Fig. 10 is a detached, sectional, view of another detail.

In the drawings forming a part of this application I have shown a present preferred form of embodiment of my invention, comprising a base 11 having a hopper 12 supported thereon by means of legs 13, a support 14 for the means for cutting off the required lumps of clay, a frame 15 for the receiving and transfer mechanism, and a support 16 for a receiving table 17. The hopper 12 is of conical form at its lower end and provided with a removable die or former 18 in the open lower end thereof, said dies being of different internal sizes and, if desired, shapes, and are for the purpose of gaging the sizes of the lumps of clay forced downwardly through said hopper by means of fan blades 19 for forcing the clay downwardly, said blades being carried by a shaft 20 which also carries a plurality of knives 21, and is provided with a gear-wheel 22 at its upper end enmeshed with a pinion 23 on a vertical shaft 24 having a bevel gear 25 at its lower end.

The support 14 carries an arm 26 upon which is slidably arranged a clay cutter 27 operable by means of a lever 28 pivoted at 29 in a support 30 and having a forked upper end 31 engaged with a pin 32 on the sliding cutter 27, the lower end of said lever being provided with a segment gear 33 enmeshed with a sliding rack 34 in the support 30, and said lever is normally maintained in the rearward position shown in Fig. 1 by means of a spring 35 secured to the support 14, and it will be seen that when the rack 34 is forced to the left, the lever carries the cutter 27 across the open end of the hopper 12 to cut off the protruding portion of the clay.

The under side of the receiving table 17 is provided with four equidistant teeth 36, each of which is adapted to be engaged by a sliding pawl 37 to revolve said table through an arc of 90 degrees in each actuation thereof, and the top of the table is provided with a set of four blocks 38 adjustable radially of the table whereby larger or smaller molds 39 may be held between corresponding blocks 38, and I also provide stop blocks 38ᵃ also radially adjustable between the blocks 38, all of said blocks being held, in one form, by means of suitable bolts passed therethrough and through corresponding slots in the table and adapted to be locked to the table by means of nuts or any suitable equivalent.

Arranged between the supports 14 and 16 on the base 11 is a frame composed of two vertical, parallel, side plates 40 having three shafts 41, 42, and 43 arranged therein, and having also a plate 44 slidable on the upper edges thereof and held thereto, as shown in Fig. 6, said slide carrying two shafts 45 and 46, the former of which carries a pinion 47 projecting through a slot 48 in the slide 44 and enmeshed with a gear 49 on the shaft 46, and said shaft 46 also carries an arm 50 secured thereto, having a small table 51 at the end thereof, a fixed pulley or grooved disk 52 being also held on said shaft 46, said groove receiving a coil spring 53 secured, at one end, to said pulley 52 and the other end to a pin 54 mounted on the slide 44, and said slide serves as a support for the end of each of two coil springs 55, the other ends of which are secured to a frame 56 having a transverse member 57 upon which the arm 50 normally rests.

Secured to the shaft 41 is a gear 58 enmeshed with a similar gear 59 on the shaft 42 in turn enmeshed with a similar gear 60 on the shaft 43, thereby insuring complemental rotation of the shafts 41 and 43 in the same direction, and each of said last named shafts carries a mutilated gear 61 and 62, respectively, the former being in the vertical plane of a rack 63 carried by the slide 44, and the latter being in the vertical plane of the pinion 47, and adapted to engage therewith, and the shaft 41, which is the power or driving shaft of the device, is also provided with a bevel gear 64 enmeshed with the bevel gear 25 on the vertical shaft 24.

Secured adjacent the frame 15 is a post 68 carrying an arm 69 above the slide 44, and the arm 50 carries a pin, or the equivalent, 70, which is adapted to slide beneath the arm 69 to hold the arm 50 in horizontal position, but reversed on its pivot shaft 46, and I also provide a finger 71 on the slide 44 adapted to strike against a stop 72 to limit the movement of the said slide to the right, when drawn in this direction by the springs 55, and, by reference to Fig. 6, it will be seen that the pawl 37 is carried by the slide 44, whereby the table 17 is revolved through one-fourth of a revolution in each actuation of the slide 44 to the left.

With parts in the positions shown in Fig. 1, the power shaft 41 turns the vertical shaft 24 and thus the hopper shaft 20, and the clay is forced out of said hopper; at the same time the shaft 43 is rotated and the mutilated gears 61 and 62 are thus revolved, and it will be noted that the action of the mutilated gear 62 is earlier than that of the gear 61. When the mutilated gear 62 strikes against the pinion 47, said pinion revolves the gear 49 and which swings the arm 50 through an arc of 180 degrees, into the position shown in full lines in Fig. 2, with the pin 70 ready to be slid under the fixed arm 69, and this brings the small table 51 on the arm 50 above said arm; the mutilated gear 61 at this time strikes the slide rack 63 and moves the slide 44 to the left, thus carrying the small table 51 directly beneath the open end of the hopper 12, and, in this forward movement of the slide 44, a projection 73 thereon strikes the slide rack 34 in the support 30 and moves it to the left, thus swinging the forked end 31 of the lever 28 to the right, and carrying the cutter 27 therewith, and a lump of clay, of a size determined by the size and shape of the die 18 in the hopper, is deposited on the small table 51. The mutilated gear 62 has now cleared the pinion 47 and the mutilated gear 61 is about to clear the rack 63 of the slide 44, and, when so cleared, the springs 55 draw the slide 44 to the right until the finger 71 thereon strikes against the stop 72, this movement having cleared the pin 70 of the arm 50 from the arm 69, and the spring 53 moves the arm 50 on its pivot until it strikes upon the frame 56, this impact tending to dislodge the lump of clay from the table 51 and to deposit it upon the mold 39, of which there are four, one in each of the quadrant channels between corresponding blocks 68, and the "bat" or "ball" so deposited may then be manually removed and passed to the "jiggerman", and it will be noted that the table 17 is actuated, by each movement of the slide 44 toward the left, to bring another mold beneath the small table 51 on the arm 50, only one mold being shown.

It will thus be seen that I provide means for feeding clay through a hopper, means for cutting off lumps of uniform size and shape, and means for depositing said lump upon a mold at a distance from the hopper, thereby dispensing with all manual labor now necessary for this operation.

While I have shown a present preferred form of construction, I do not limit myself thereto, but may make changes in the same, and modifications thereover, within the scope of the following claims, without departing from the spirit of my invention, or sacrificing its advantages.

Having fully described my invention, what I claim as new, and desire to secure by Letters Patent, is:—

1. A machine of the class described, comprising a base, a hopper thereon, means for forcing plastic material through said hopper, means for separating a portion thereof therefrom, a mold, a slide interposed between said hopper and mold, an arm pivoted on said slide, means for moving said arm into position beneath said hopper, means for removing said arm from beneath said hopper after a portion of said material has been deposited thereon, and means for swinging said arm, with said portion of material, to deposit the same upon said mold.

2. A machine of the class described, comprising a base, a hopper thereon, means for forcing plastic material through said hopper, means for separating a portion thereof therefrom, means for gaging the amount so separated, a mold, a slide interposed between said hopper and mold, an arm pivoted on said slide, means for moving said arm into position beneath said hopper, means for removing said arm from beneath said hopper, after a portion of said material has been deposited thereon, and means for swinging said arm, with said portion of material, to deposit the same upon said mold.

3. A machine of the class described, comprising a base, a hopper thereon, means for forcing plastic material through said hopper, means for separating a portion thereof therefrom, a mold, a table supporting said mold, means for revolving said table, a slide interposed between said hopper and mold, an arm pivoted on said slide, means for moving said arm into position beneath said hopper and from thereunder after a portion of said material has been deposited thereon, and means for swinging said arm, with said portion of material, to deposit the same upon said mold, said table carrying a plurality of molds adapted to be successively brought into position for receiving successive portions of material.

In testimony whereof I have signed my name to this specification in the presence of two subscribing witnesses.

FRED G. HANEY.

Witnesses:
C. W. POWELL,
EARL E. POWELL.

Copies of this patent may be obtained for five cents each, by addressing the "Commissioner of Patents, Washington, D. C."